US010182265B2

(12) United States Patent
Frazier et al.

(10) Patent No.: US 10,182,265 B2
(45) Date of Patent: Jan. 15, 2019

(54) METHODS AND SYSTEMS FOR FACILITATING USER ACCESS TO MEDIA CONTENT PROGRAMS INCLUDED IN A PROGRAMMING BLOCK

(75) Inventors: Kristopher T. Frazier, Frisco, TX (US); Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 615 days.

(21) Appl. No.: 13/211,812

(22) Filed: Aug. 17, 2011

(65) Prior Publication Data

US 2013/0047187 A1 Feb. 21, 2013

(51) Int. Cl.
*G06F 3/00* (2006.01)
*G06F 13/00* (2006.01)
(Continued)

(52) U.S. Cl.
CPC ..... *H04N 21/4826* (2013.01); *H04N 21/4334* (2013.01); *H04N 21/462* (2013.01); *H04N 21/47214* (2013.01); *H04N 21/4882* (2013.01)

(58) Field of Classification Search
CPC ............ H04N 21/478; H04N 21/4856; H04N 21/2662; H04N 21/8355; H04N 21/4753; H04N 21/472; H04N 21/4825; H04N 21/443; H04N 21/4126; H04N 21/4532; H04N 21/4622; H04N 21/2547; H04N 21/431; H04N 21/2668; H04N 21/6543; H04N 21/47214; H04N 21/2343; H04N 21/4316; H04N 21/485; H04N 21/23424; H04N 21/8456; H04N 21/235; H04N 21/25875; H04N 21/2225; H04N 21/4722; H04N 21/4333; H04N 21/4667;
(Continued)

(56) References Cited

U.S. PATENT DOCUMENTS

| 6,353,444 B1 * | 3/2002 | Katta | H04N 5/44543 348/E5.105 |
| 7,581,238 B1 * | 8/2009 | Taylor | H04N 5/44543 386/291 |

(Continued)

OTHER PUBLICATIONS

Nick at Nite From Wikipedia, the encyclopedia Jul. 1985.*

*Primary Examiner* — Nasser M Goodarzi
*Assistant Examiner* — An V Nguyen

(57) ABSTRACT

An exemplary method includes a media content presentation system detecting an access event initiated by a user and performed by a media content processing subsystem with respect to a media content program during a time period associated with a provider-scheduled presentation of the media content program, identifying a programming block of which the media content program is a part, determining that the user has failed to direct the media content processing subsystem to perform an additional access event with respect to one or more additional media content programs that are also a part of the programming block during a time period associated with a provider-scheduled presentation of the one or more additional media content programs, and facilitating, in response to the determining, access by the user to the one or more additional media content programs included in the programming block. Corresponding methods and systems are also disclosed.

10 Claims, 11 Drawing Sheets

(51) Int. Cl.
*H04N 5/445* (2011.01)
*H04N 21/482* (2011.01)
*H04N 21/433* (2011.01)
*H04N 21/462* (2011.01)
*H04N 21/472* (2011.01)
*H04N 21/488* (2011.01)

(58) Field of Classification Search
CPC ........... H04N 21/458; H04N 21/25866; H04N 21/482; H04N 21/4334; H04N 21/4821; H04N 21/278; H04N 21/4122; H04N 21/8173; H04N 21/26283; H04N 21/4583; H04N 21/4782; H04N 21/262; H04N 21/4508; H04N 21/6125; H04N 21/4751; H04N 21/858; H04N 21/436; H04N 21/4668
USPC .... 725/28, 58, 133, 14, 46, 47, 61, 135, 50, 725/13, 37–38, 41, 44, 40, 93, 109, 113, 725/116, 42, 87, 110, 91, 78, 105, 25, 81, 725/145, 94, 118, 115, 97, 39, 134, 35, 725/32, 52, 152, 34, 60, 23, 89, 114, 132, 725/24, 120, 86; 707/104.1
See application file for complete search history.

(56) References Cited

U.S. PATENT DOCUMENTS

| | | | |
|---|---|---|---|
| 7,861,258 B2 * | 12/2010 | Barton et al. | 725/28 |
| 7,882,528 B1 * | 2/2011 | Taylor et al. | 725/58 |
| 2003/0126600 A1 * | 7/2003 | Heuvelman | H04N 5/44543 725/35 |
| 2004/0003413 A1 * | 1/2004 | Boston et al. | 725/133 |
| 2006/0167943 A1 * | 7/2006 | Rosenberg | 707/104.1 |
| 2009/0158350 A1 * | 6/2009 | DeCamp | H04N 5/44543 725/58 |
| 2010/0175090 A1 * | 7/2010 | Cordray | 725/58 |
| 2012/0260286 A1 * | 10/2012 | Rothschild | H04N 21/4825 725/39 |

* cited by examiner

METHODS AND SYSTEMS FOR FACILITATING USER ACCESS TO MEDIA CONTENT PROGRAMS INCLUDED IN A PROGRAMMING BLOCK

BACKGROUND INFORMATION

"Block programming" refers to a strategy used by media content providers in which similar media content programs (i.e., media content programs designed to appeal to the same demographic or audience) are consecutively presented during a predetermined period of time (e.g., Thursday nights). Block programming not only benefits media content providers and advertisers by maintaining viewership throughout the presentation of an entire programming block, but it also allows end users (e.g., viewers) to readily identify and experience media content programs that may be of interest to them.

However, with the advent of digital video recording ("DVR") technology and on-demand programming, more and more users do not watch or otherwise experience media content programs during their provider-scheduled presentation times. As a result, a user may not even be aware of, let alone experience, media content programs included in the same programming block as a particular media content program that the user experiences in a time-shifted and/or on-demand manner.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
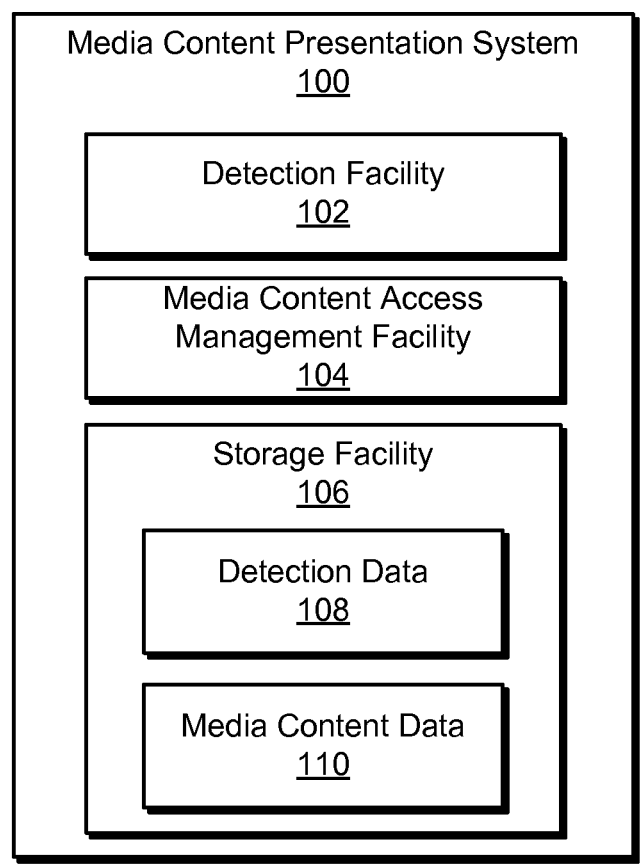
FIG. 1 illustrates an exemplary media content presentation system according to principles described herein.

Methods and systems for facilitating user access to media content programs included in a programming block are described herein. As will be described herein, a media content presentation system may detect an access event initiated by a user and performed by a media content processing subsystem with respect to a media content program during a time period associated with a provider-scheduled presentation of the media content program, identify a programming block of which the media content program is a part, determine that the user has failed to direct the media content processing subsystem to perform an additional access event with respect to one or more additional media content programs that are also a part of the programming block during a time period associated with a provider-scheduled presentation of the one or more additional media content programs, and facilitate, in response to the determination, access by the user to the one or more additional media content programs included in the programming block.

The methods and systems described herein allow a user to readily discover and access (e.g., watch, listen to, record, learn about, and/or be notified of) one or more media content programs included in the same programming block as a media content program that the user has already accessed. For example, a friend of a user may recommend to the user that he or she watches a particular sitcom presented by way of a channel at 7:30 pm on a particular night of the week. The user may watch and/or record the sitcom at 7:30 pm, not knowing that another television program similar to the sitcom and included in the same programming block as the sitcom was presented before the presentation of the sitcom (e.g., at 7:00 pm). The methods and systems described herein may detect that the user is watching and/or has watched the sitcom, determine that the user failed to watch and/or record the television program scheduled for presentation before the presentation of the sitcom, and facilitate access by the user to the missed television program (e.g., by automatically presenting a recorded version of the television program to the user after the presentation of the sitcom, notifying the user of an availability of the television program, etc.).

The methods and systems described herein may also be advantageous to media content providers. For example, advertisers may be more likely to advertise during a particular media content program if they know that users will have access to all of the media content programs included in a particular programming block.

As used herein, an "access event" performed with respect to a media content program refers to a presentation of the media content program and/or a recording of the media content program. For example, a user may initiate an access event with respect to a media content program by directing a media content processing device (e.g., a set-top box device, etc.) to be tuned to a channel carrying the media content program during a time period associated with a provider-scheduled presentation of the media content program. Additionally or alternatively, a user may initiate an access event with respect to a media content program by directing (e.g., scheduling) a media content processing device (e.g., a set-top box device or a server) to record (e.g., DVR) the media content program during a time period associated with a provider-scheduled presentation of the media content program.

As used herein, a "programming block" refers to a plurality of media content programs that have been intentionally grouped together for consecutive presentation by a media content provider during a predetermined time period (e.g., in order to target the same demographic or audience). For example, a programming block may include a group of television programs (e.g., sitcoms) scheduled for concurrent presentation on a particular night of the week or a block of radio content scheduled for presentation during a particular time of day (e.g., an afternoon of jazz music).

As used herein, a "media content program" refers to any television program, on-demand media program, pay-per-view media program, broadcast media program (e.g., broadcast television program), multicast media program (e.g., multicast television program), narrowcast media program (e.g., narrowcast video-on-demand program), IPTV media content, video, movie, audio program, or any segment, component, or combination of these or other forms of media content that may be processed by a media content processing device for experiencing by a user.

FIG. 1 illustrates an exemplary media content presentation system 100 (or simply "system 100"). As shown, system 100 may include, without limitation, a detection facility 102, a media content access management facility 104 (or simply "access management facility 104"), and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect an access event initiated by a user and performed by a media content processing subsystem with respect to a media content program during a time period associated with a provider-scheduled presentation of the media content program. As will be described below, the media content processing subsystem may be implemented by one or more media content processing devices.

Detection facility 102 may detect an access event initiated by a user and performed by a media content processing subsystem in any suitable manner. For example, detection facility 102 may detect a presentation of the media content program by the media content processing subsystem to the user during a time period associated with a provider-scheduled presentation of the media content program. As used herein, a presentation of a media content program "to a user" may include a presentation of the media content program for experiencing by the user, even if the user is not in the act of viewing or otherwise experiencing the media content program.

Additionally or alternatively, detection facility 102 may detect a recording of the media content program by the media content processing subsystem during the time period associated with the provider-scheduled presentation of the media content program. Either of these types of access events may be initiated by a user in any suitable manner. For example, a user may initiate a presentation of a media content program by directing the media content processing subsystem to tune to a channel carrying the media content program during a time period specified by a media content provider (e.g., a subscriber television network provider). As another example, a user may initiate a recording of a media content program by scheduling the media content processing subsystem to record the media content program during a time period specified by the media content provider.

Access management facility 104 may be configured to perform one or more access management operations associated with media content available to a user by way of the media content processing subsystem. To illustrate, in response to an access event performed with respect to a media content program being detected by detection facility 102, access management facility 104 may identify a programming block of which the media content program is a part. Access management facility 104 may identify a programming block that includes a particular media content program in any suitable manner. For example, access management facility 104 may perform the identification based on metadata associated with the media content program, based on program guide data provided by a media content provider, and/or in any other manner as may serve a particular implementation.

Access management facility 104 may then determine that the user has failed to direct the media content processing subsystem to perform an additional access event with respect to one or more additional media content programs that are also part of the programming block during a time period associated with a provider-scheduled presentation of the one or more additional media content programs. For example, access management facility 104 may detect that a user has initiated an access event with respect to only one television program included in a programming block of three television programs. The failure of the user to initiate an access event with respect to the other two television programs may indicate that the user is not aware of other two television programs, that the user forgot to view or record the other two television programs, or that the media content processing subsystem did not present or record the other two television programs for any other reason.

In response to the determination, access management facility 104 may facilitate access by the user to the one or more additional media content programs included in the programming block. Access management facility 104 may facilitate access by the user to the one or more additional media content programs in any suitable manner. For example, access management facility 104 may direct the media content processing subsystem to automatically record the one or more additional media content programs during the time period associated with the provider-scheduled presentation of the one or more additional media content programs, direct the media content processing subsystem to automatically record the one or more additional media content programs during a time period associated with a subsequent provider-scheduled presentation of the one or more additional media content programs, provide the user with access to one or more video-on-demand assets representative of the one or more additional media content instances, notify the user of an availability of the one or more additional media content programs, provide the user with one or more access options associated with the one or more additional media content programs, direct the media content processing subsystem to automatically present a recorded version of the one or more additional media content programs to the user, and/or facilitate access to the one or more additional media content programs in any other way as may serve a particular implementation. Examples of facilitating access by a user to the one or more additional media content programs will be described below.

Storage facility 106 may be configured to maintain detection data 108 utilized and/or generated by detection facility 102 and media content data 110 representative of one or more media content programs (e.g., a recorded version of a media content program). Storage facility 106 may be configured to maintain additional or alternative data as may serve a particular implementation.

Figure 2:
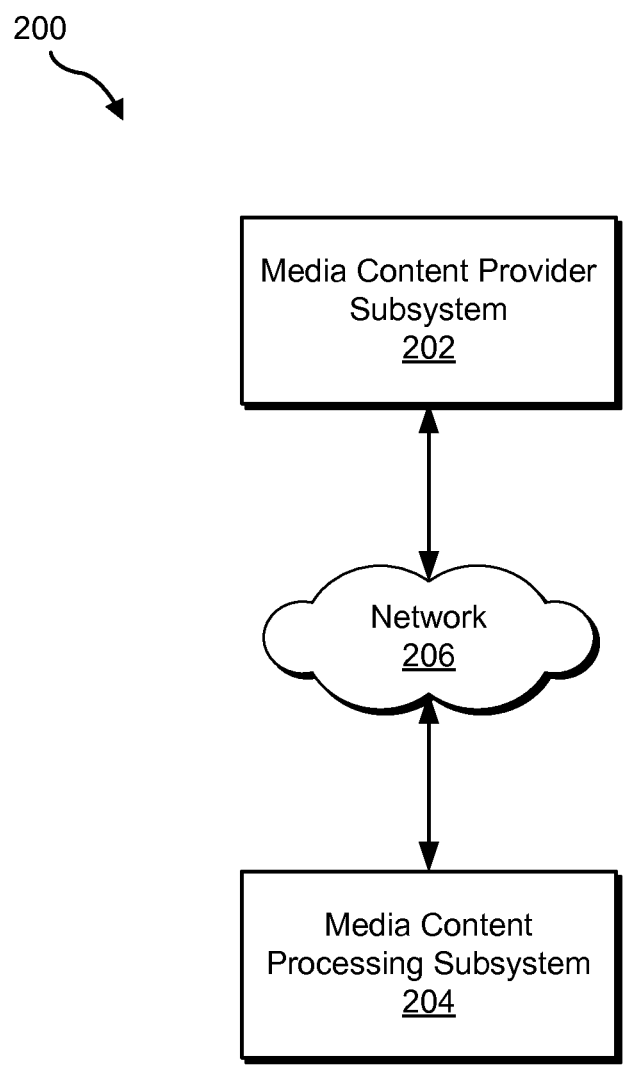
FIG. 2 illustrates an exemplary implementation of the system of FIG. 1 according to principles described herein.

FIG. 2 illustrates an exemplary implementation 200 of system 100 wherein a media content provider subsystem 202 is communicatively coupled to a media content processing subsystem 204 by way of a network 206. As will be described in more detail below, detection facility 102, access management facility 104, and storage facility 108 may each be implemented by media content provider subsystem 202 and/or media content processing subsystem 204.

Media content provider subsystem 202 may be associated with a service provider (e.g., a subscriber television service provider, an Internet service provider, etc.), a media content program provider (e.g., ESPN, NBC, etc.), and/or any other type of media content provider. Accordingly, media content provider subsystem 202 may be configured to provide one or more media content services (e.g., television services, video-on-demand services, Internet services, application services, etc.) to media content processing subsystem 204. For example, media content provider subsystem 202 may be configured to manage (e.g., maintain, process, distribute, and/or generate) media content (e.g., media content programs, advertisements, etc.) configured to be delivered to media content processing subsystem 204. Media content provider subsystem 202 may be implemented by one or more computing devices as may serve a particular implementation.

Media content processing subsystem 204 may facilitate access by a user to content (e.g., media content programs and/or advertisements) provided by media content provider subsystem 202. For example, media content processing subsystem 204 may be configured to perform one or more access events at the direction of a user. To illustrate, media content processing subsystem 204 may present and/or record a media content program at the direction of a user.

Media content processing subsystem 204 may be implemented by any suitable combination of media content processing or computing devices ("processing devices"). For example, media content processing subsystem 204 may be implemented by one or more local processing devices (i.e., processing devices that the user interacts with directly such as set-top box devices, DVR devices, personal computers, mobile devices (e.g., mobile phones and/or tablet computers), personal-digital assistant devices, gaming devices, television devices, etc.) and/or one or more remote processing devices (i.e., processing devices that the user does not interact with directly such as servers, remote DVR devices, network devices, etc.). In some examples, media content processing subsystem 204 may be at least partially implemented by one or more processing devices associated with and/or maintained by a media content provider. For example, media content processing subsystem 204 may be at least partially implemented by a network DVR device configured to be located at a premises maintained by the media content provider.

Media content provider subsystem 202 and media content processing subsystem 204 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 202 and media content processing subsystem 204 may communicate using any suitable network. For example, as shown in FIG. 2, media content provider subsystem 202 and media content processing subsystem 204 may be configured to communicate with each other by way of network 206. Network 206 may include one or more networks or types of networks capable of carrying communications and/or data signals between media content provider subsystem 202 and media content processing subsystem 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by media content provider subsystem 202 or by media content processing subsystem 204. In other embodiments, components of system 100 may be distributed across media content provider subsystem 202 and media content processing subsystem 204.

Figure 3:
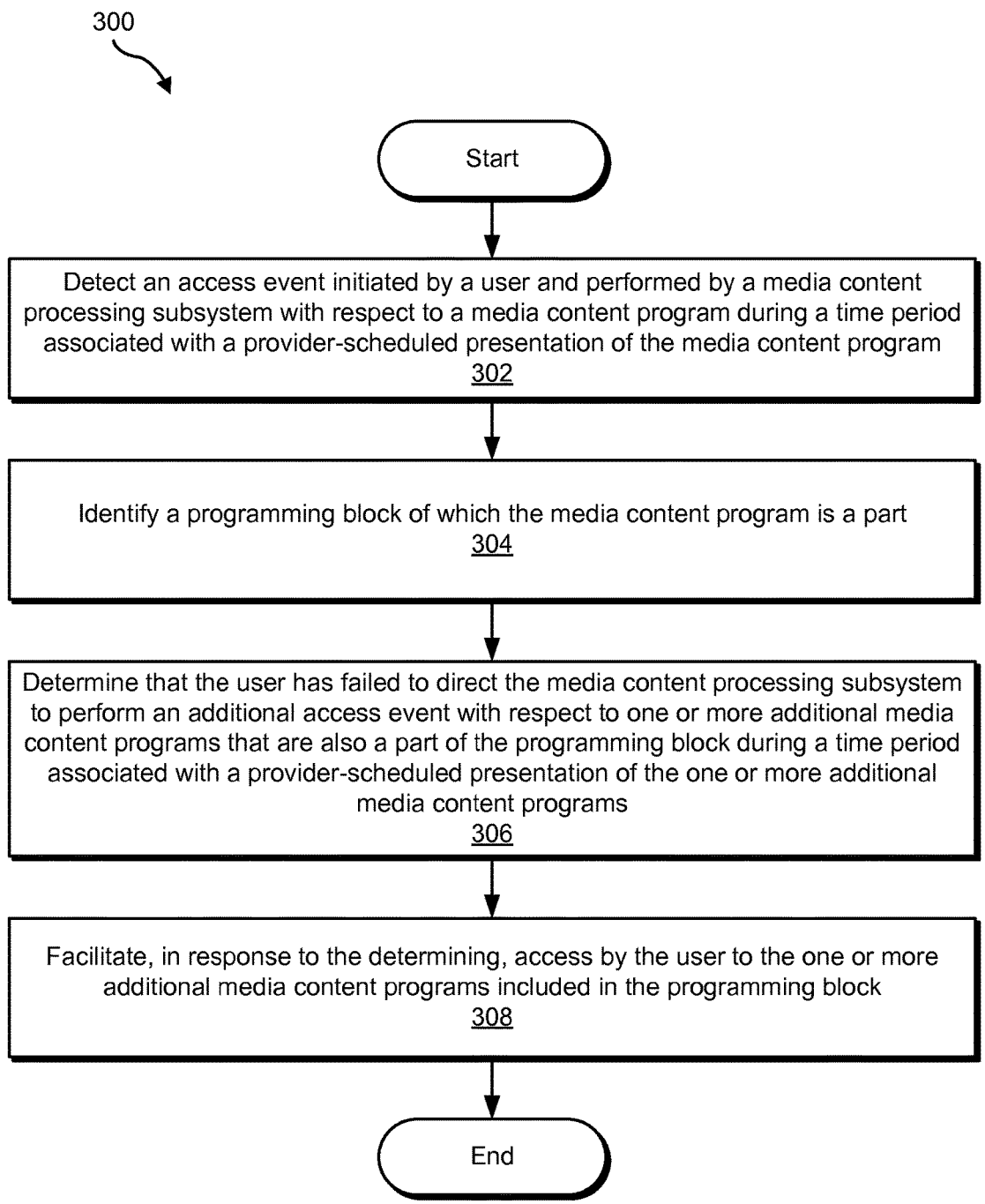
FIG. 3 illustrates an exemplary method of facilitating user access to media content programs included in a programming block according to principles described herein.

FIG. 3 illustrates an exemplary method 300 of facilitating user access to media content programs included in a programming block. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of system 100, media content provider subsystem 202, and/or media content processing subsystem 204.

In step 302, a media content presentation system detects an access event initiated by a user and performed by a media content processing subsystem with respect to a media content program during a time period associated with a provider-scheduled presentation of the media content program. Step 302 may be performed in any of the ways described herein.

In step 304, the media content presentation system identifies a programming block of which the media content program is a part. Step 304 may be performed in any of the ways described herein.

In step 306, the media content presentation system determines that the user has failed to direct the media content processing subsystem to perform an additional access event with respect to one or more additional media content programs that are also part of the programming block during a time period associated with a provider-scheduled presentation of the one or more additional media content programs. Step 306 may be performed in any of the ways described herein.

In step 308, in response to the determination made in step 306, the media content presentation system facilitates access by the user to the one or more additional media content programs included in the programming block. Various examples of facilitating access to the one or more additional media content programs included in the programming block will now be given.

Figure 4A:
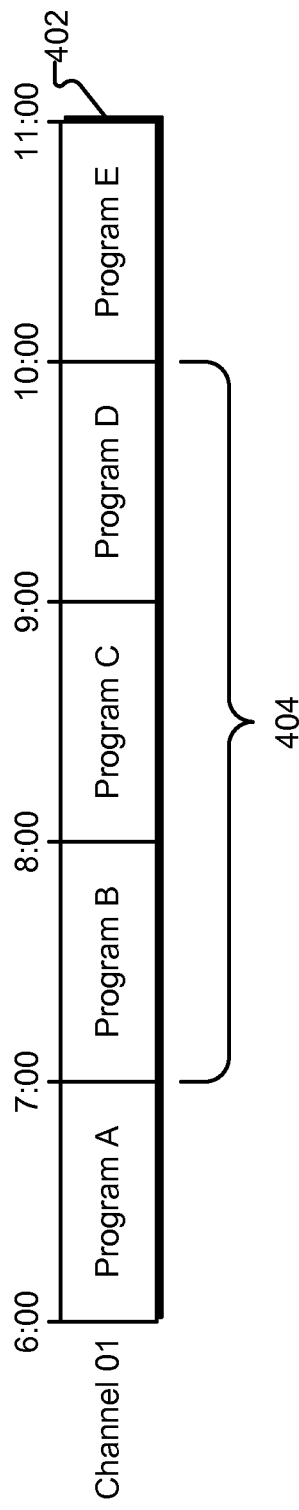
FIG. 4A illustrates an exemplary provider-scheduled presentation timeline for a particular channel according to principles described herein.

FIG. 4A illustrates an exemplary provider-scheduled presentation timeline 402 for a particular channel labeled "Channel 01" during a five hour time period in between 6:00 (i.e., 6 o'clock) and 11:00 (i.e., 11 o'clock). FIG. 4A will be used to illustrate various manners in which system 100 may facilitate access by a user to each media content program included in a programming block.

As shown in FIG. 4A, five media content programs (i.e., programs A-E) are scheduled to be presented by way of the channel between 6:00 and 11:00. Three of the media content programs (i.e., program B, program C, and program D) are included in a provider-specified programming block 404, and are therefore scheduled to be consecutively presented during a time period associated with programming block 404 as shown in FIG. 4A.

Figure 4B:
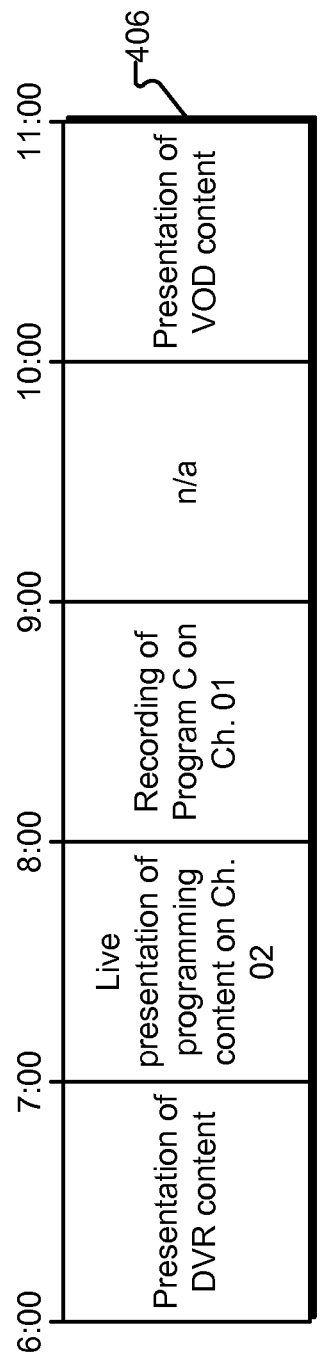
FIG. 4B shows an exemplary user-initiated access event timeline for the same time period shown in FIG. 4A according to principles described herein.

In some instances, a user may watch and/or record only a portion of the media content programs included programming block 404. To illustrate, FIG. 4B shows an exemplary user-initiated access event timeline 406 for the same time period shown in FIG. 4A. Timeline 406 graphically depicts a series of access events initiated by a user and performed by a media content processing subsystem (e.g., a set-top box device) associated with the user. For example, timeline 406 shows that media content processing subsystem presents DVR content during the first hour, presents live programming content carried by a channel labeled "Channel 02" during the second hour, records program C carried by the channel "Channel 01" during the third hour, does not perform any type of access event during the fourth hour, and presents video-on-demand ("VOD") content during the fifth hour. Hence, as indicated by timeline 406, the user has failed to direct the media content processing subsystem to perform an access event with respect to two of the three media content programs included in programming block 404 (i.e., with respect to programs B and D).

System 100 (i.e., access management facility 104) may facilitate access by the user to programs B and D in any suitable manner. For example, system 100 may direct the media content processing subsystem to automatically record programs B and D during their respective provider-scheduled presentation time periods. System 100 may then notify the user of an availability of the recorded media content programs. In this manner, the user may subsequently watch or otherwise experience programs B and D in a time-shifted manner.

In some instances, the media content processing subsystem may not be able to record programs B and D. For example, the recording and/or tuning capabilities of the media content processing subsystem may be in use or otherwise unavailable during the provider-scheduled presentation time periods of programs B and D. In this case, system 100 may direct the media content processing subsystem to record programs B and D during a subsequent provider-scheduled presentation time period. For example, programs B and D may each be sitcoms. System 100 may accordingly direct the media content processing subsystem to record the next episode of each sitcom that is presented by the media content provider. This recording may be performed automatically or in response to a user input command received by system 100.

Alternatively, system 100 may determine that programs B and D are available as video-on-demand assets. In this case, system 100 may facilitate access by the user to programs B and D by providing the user with access to the video-on-demand assets (e.g., by downloading or otherwise acquiring the video-on-demand assets).

Figure 5:
FIG. 5 illustrates a presentation of a particular media content program according to principles described herein.

Additionally or alternatively, system 100 may facilitate access by the user to programs B and D by notifying the user of an availability the media content programs. This may be performed in any suitable manner. For example, FIG. 5 illustrates a presentation 500 of program C. Presentation 500 may occur live during a provider-scheduled presentation time period or subsequently in a time-shifted manner. In either case, system 100 may notify a user of an availability of programs B and/or D by displaying a notification 502 together with the presentation 500 of program C. Notification 502 may alternatively be presented to the user in one or more other graphical user interfaces ("GUIs") (e.g., within a program guide GUI, a DVR content management GUI), etc.

Figure 6:
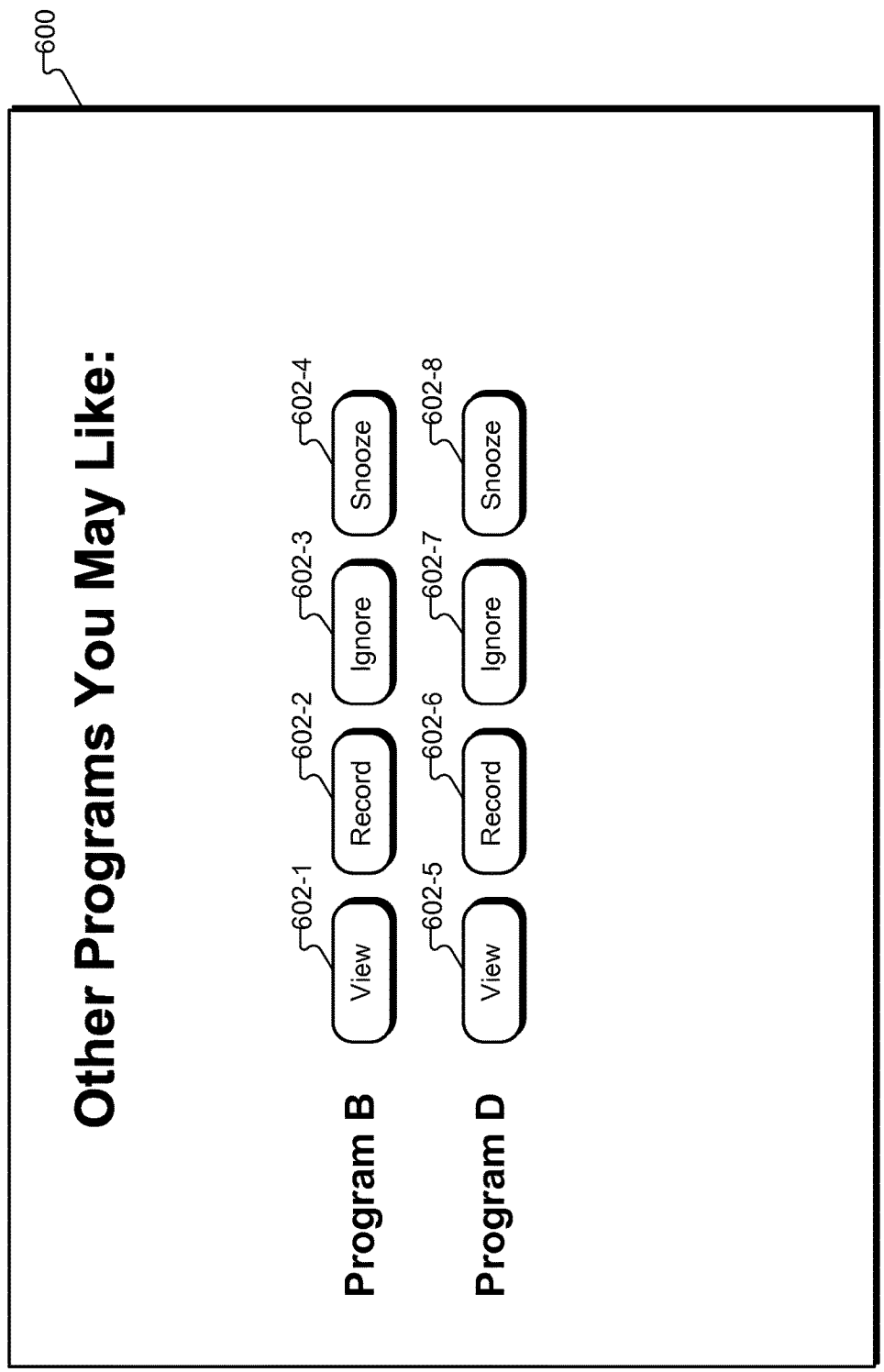
FIG. 6 shows an exemplary graphical user interface ("GUI") that may be presented to a user and that includes various access options associated with media content programs according to principles described herein.

Additionally or alternatively, system 100 may facilitate access by the user to programs B and D by providing the user with one or more access options associated with programs B and D. To illustrate, FIG. 6 shows an exemplary GUI 600 that may be presented to a user and that includes various access options 602 (i.e., access options 602-1 through 602-8) associated with programs B and D. GUI 600 may be presented in response to a user selection of notification 502 shown in FIG. 5, immediately following a presentation of program C and/or in any other manner as may serve a particular implementation.

As shown in FIG. 6, the various access options 602 associated with each media content program may include a "view" option (e.g., access option 602-1), a "record" option (e.g., access option 602-2), an "ignore" option (e.g., access option 602-3), and a "snooze" option (e.g., access option 602-4). To illustrate a functionality associated with each of these access options 602, a user may select "view" option 602-1 to direct the media content processing subsystem to present program B, "record" option 602-2 to direct the media content processing subsystem to record program B, "ignore" option 602-3 to direct the media content processing subsystem to ignore program B (i.e., never perform an access event with respect to program B), or "snooze" option 602-4 to direct the media content processing subsystem to present the user with an option to view and/or record program B at a later time or date. Additional or alternative access options may be associated with each media content program as may serve a particular implementation.

Additionally or alternatively, system 100 may facilitate access by the user to programs B and D by directing the media content processing subsystem to automatically present recorded versions of programs B and D (e.g., versions of programs B and D that have been recorded using a DVR application and/or that are available as video-on-demand assets) to the user. This may be performed in any suitable manner. For example, system 100 may detect a presentation of program C by the media content processing subsystem to the user (e.g., system 100 may detect that the user watches a recorded version of program C in a time-shifted manner) and direct the media content processing subsystem to automatically present recorded versions of programs B and D to the user immediately following the presentation of program.

Figure 7:
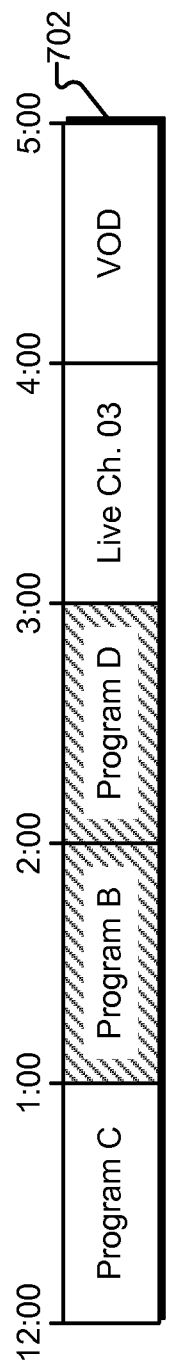
FIG. 7 shows an exemplary presentation timeline according to principles described herein.

To illustrate, FIG. 7 shows an exemplary presentation timeline 702 that illustrates an order in which various types of media content may be presented to the user. As shown in FIG. 7, the user may direct the media content processing subsystem to present a recorded version of program C between 12:00 and 1:00. System 100 may detect this presentation of program C and, in response, direct the media content processing subsystem to automatically present recorded versions of programs B and D (in any suitable order) to the user immediately following the presentation of program C (i.e., between 1:00 and 3:00). After recorded versions of programs B and D have been presented, the media content processing subsystem may return to presenting content specified by the user (e.g., live programming on "Channel 03" between 3:00 and 4:00 and VOD content between 4:00 and 5:00.)

Alternatively, system 100 may detect that program C is presented by the media content processing subsystem immediately prior to a user-scheduled presentation of a media content program that is not a part of programming block 404. In response, system 100 may direct the media content processing subsystem to delay presenting recorded versions of programs B and C until after the presentation of the media content program that is not a part of programming block 404. In this manner, the user-scheduled presentation of the media content program that is not a part of programming block 404 is not interrupted.

Figure 8:
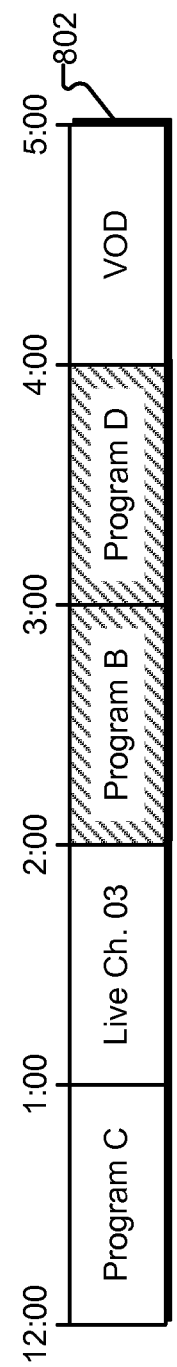
FIG. 8 shows another exemplary presentation timeline according to principles described herein.

To illustrate, FIG. 8 shows another exemplary presentation timeline 802 in which program C is presented immediately prior to a user-scheduled presentation of live programming on a channel named "Channel 03." System 100 may accordingly direct the media content processing subsystem to automatically present recorded versions of programs B and D (in any suitable order) to the user immediately following the presentation of the user-scheduled presentation of the live programming (i.e., between 2:00 and 4:00).

Figure 9:
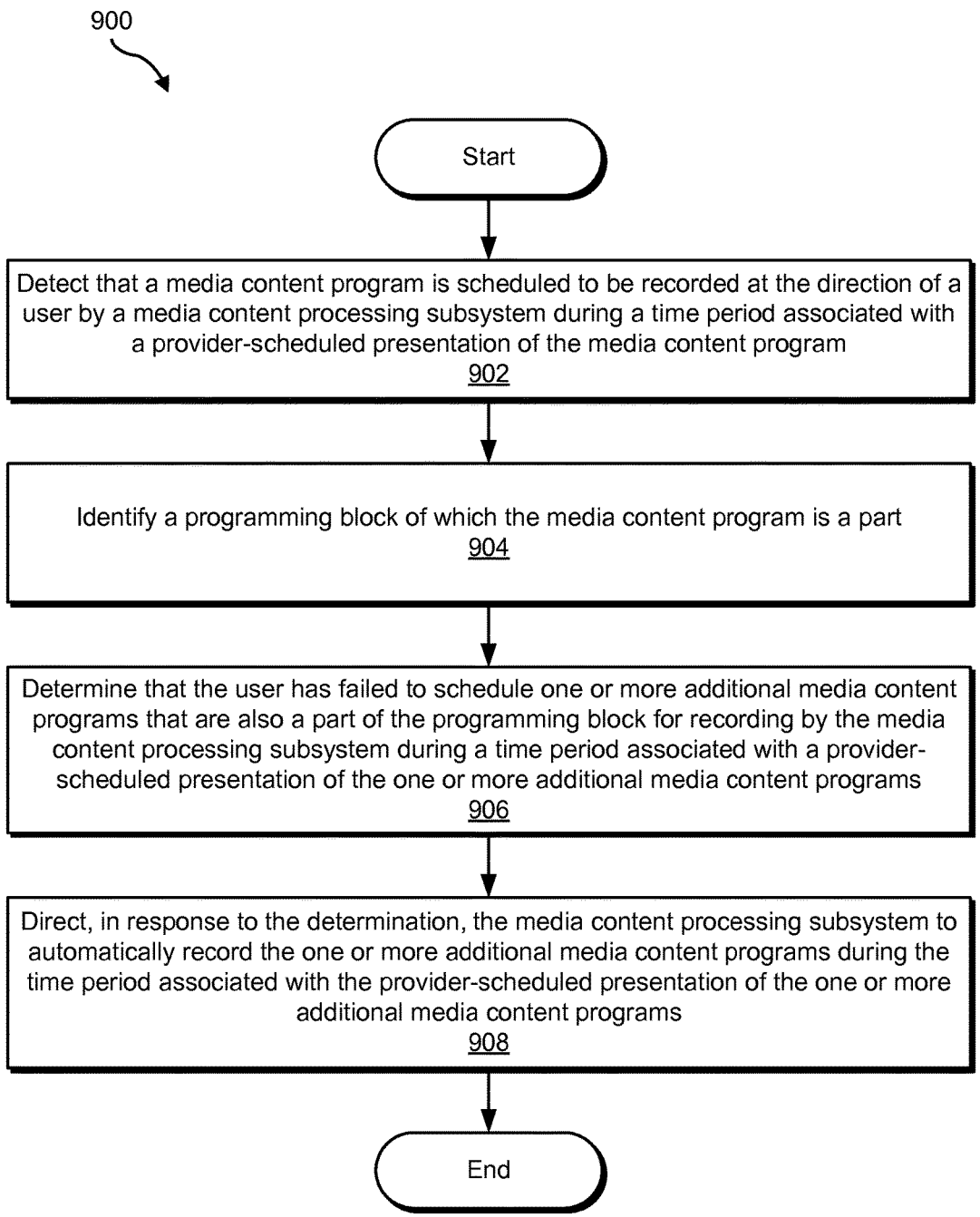
FIG. 9 illustrates another exemplary method of facilitating user access to media content programs included in a programming block according to principles described herein.

FIG. 9 illustrates another exemplary method 900 of facilitating user access to media content programs included in a programming block. While FIG. 9 illustrates exemplary steps according to one embodiment, other embodiments may omit, add to, reorder, and/or modify any of the steps shown in FIG. 9. One or more of the steps shown in FIG. 9 may be performed by any component or combination of components of system 100, media content provider subsystem 202, and/or media content processing subsystem 204.

In step 902, a media content presentation system detects that a media content program is scheduled to be recorded at the direction of a user by a media content processing subsystem during a time period associated with a provider-scheduled presentation of the media content program. Step 902 may be performed in any of the ways described herein.

In step 904, the media content presentation system identifies a programming block of which the media content program is a part. Step 904 may be performed in any of the ways described herein.

In step 906, the media content presentation system determines that the user has failed to schedule one or more additional media content programs that are also a part of the programming block for recording by the media content processing subsystem during a time period associated with a provider-scheduled presentation of the one or more additional media content programs. Step 906 may be performed in any of the ways described herein.

In step 908, the media content presentation system directs, in response to the determination performed in step 906, the media content processing subsystem to automatically record the one or more additional media content programs during the time period associated with the provider-scheduled presentation of the one or more additional media content programs. Step 908 may be performed in any of the ways described herein.

Figure 10:
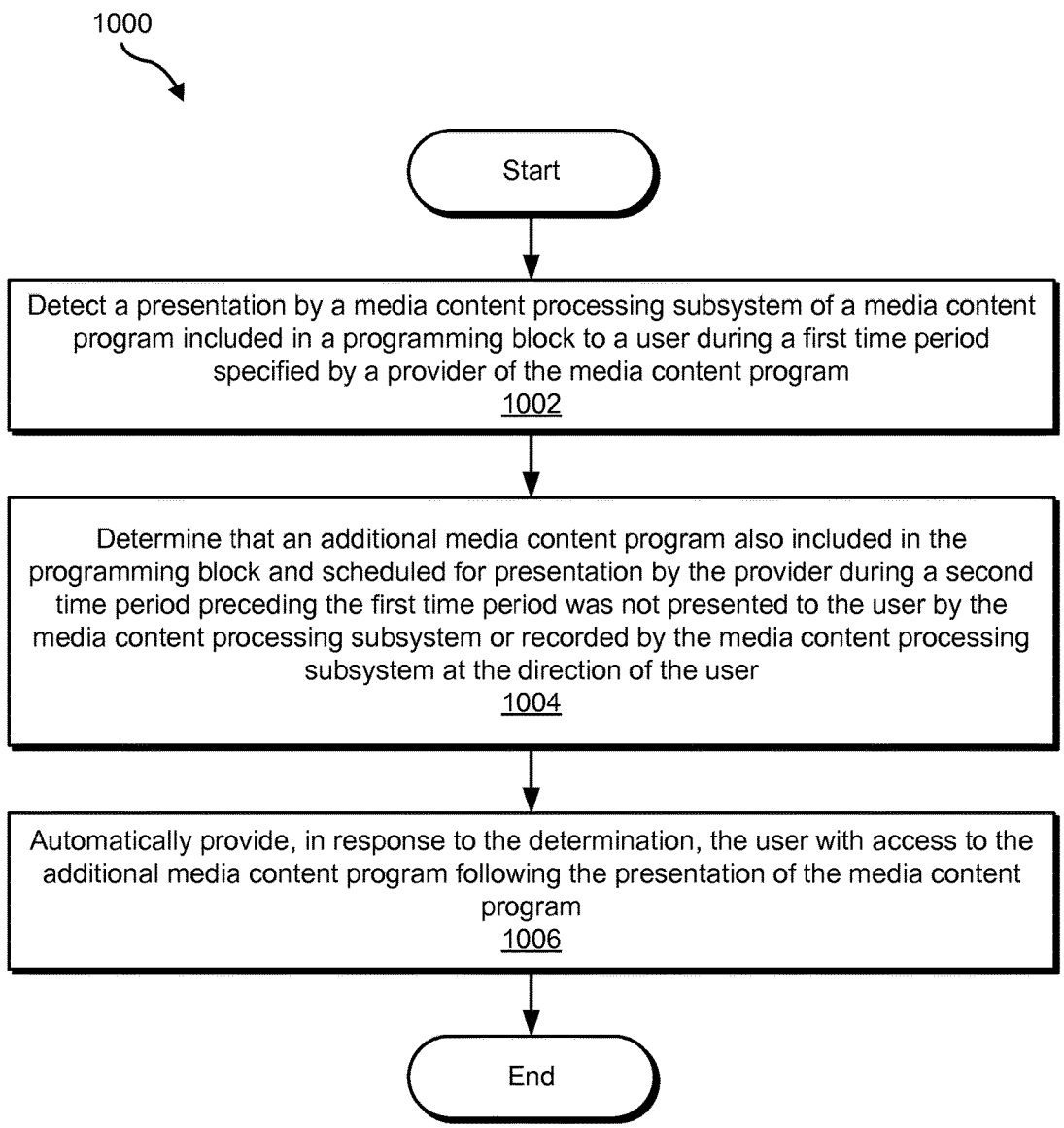
FIG. 10 illustrates another exemplary method of facilitating user access to media content programs included in a programming block according to principles described herein.

FIG. 10 illustrates another exemplary method 1000 of facilitating user access to media content programs included in a programming block. While FIG. 10 illustrates exemplary steps according to one embodiment, other embodiments may omit, add to, reorder, and/or modify any of the steps shown in FIG. 10. One or more of the steps shown in FIG. 10 may be performed by any component or combination of components of system 100, media content provider subsystem 202, and/or media content processing subsystem 204.

In step 1002, a media content presentation system detects a presentation by a media content processing subsystem of a media content program included in a programming block to a user during a first time period specified by a provider of the media content program. Step 1002 may be performed in any of the ways described herein.

In step 1004, the media content presentation system determines that an additional media content program also included in the programming block and scheduled for presentation by the provider during a second time period preceding the first time period was not presented to the user by the media content processing subsystem or recorded by the media content processing subsystem at the direction of the user. Step 1004 may be performed in any of the ways described herein.

In step 1006, the media content presentation system automatically provides, in response to the determination made in step 1004, the user with access to the additional media content program following the presentation of the media content program. Step 1006 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
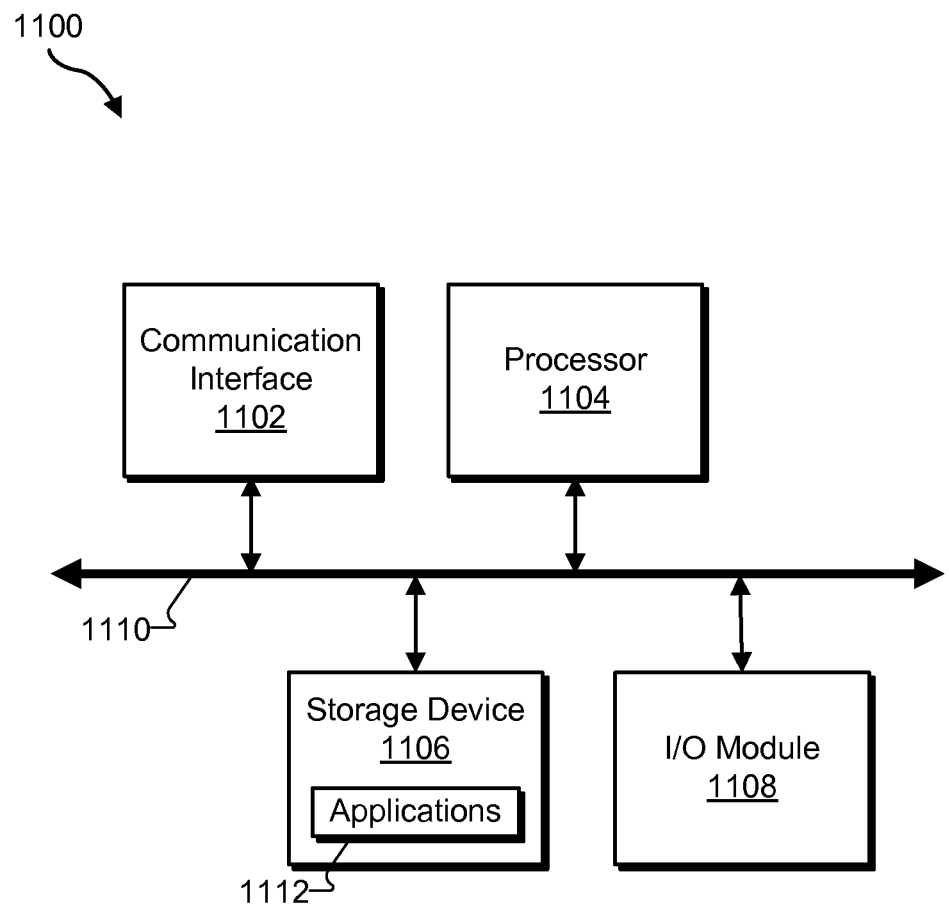
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102 and/or access management facility 104. Likewise, storage facility 106 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a media content presentation system, an access event initiated by a user and performed by a media content processing subsystem with respect to an episode of a first media content program during a time period associated with a provider-scheduled presentation of the first media content program, the episode of the first media content program included in a plurality of episodes associated with the first media content program, the access event including a presentation of the episode of the first media content program to the user;
   identifying, by the media content presentation system, a programming block of which the first media content program is a part, the programming block including a plurality of media content programs in a same genre that have been intentionally grouped together by a media content provider for consecutive presentation during a predetermined time period, the programming block further comprising an additional episode of a second media content program that is included in the plurality of media content programs in the programing block, the additional episode of the second media content program included in a plurality of episodes associated with the second media content program, and each episode included in the plurality of episodes associated with the second media content program different from each episode included in the plurality of episodes associated with the first media content program;
   determining, by the media content presentation system, that the user has failed to direct the media content processing subsystem to perform an additional access event with respect to the additional episode of the second media content program during the time period associated with the provider-scheduled presentation of the second media content program during the programming block, wherein the time period associated with the provider-scheduled presentation of the second media content program during the programming block precedes the time period associated with the provider-scheduled presentation of the first media content program during the programing block; and
   facilitating, by the media content presentation system in response to the determining, access by the user to the second media content program included in the programming block,
   wherein the facilitating of access by the user to the second media content program included in the programming block comprises determining, by the media content processing subsystem, that the second media content program is available as a video-on-demand asset, presenting, during the presentation of the first media content program by the media content processing subsystem, the user with a notification that is overlaid over the first media content program in a pop-up window and that indicates that the second media content program is related to the first media content program and is available for presentation to the user as the video-on-demand asset, determining, by the media content presentation system, that the presentation of the first media content program is performed immediately prior to a user-scheduled presentation of a third media content program that is not part of the programing block, directing, by the media content presentation system, the media content processing subsystem to delay presentation of the second media content program until after the presentation of the third media content program that is not part of the programing block, and directing, by the media content presentation system, the media content processing subsystem to automatically present, based on the second media content program being available as the video-on-demand asset and based on the second media content program and the first media content program being part of the same programing block that includes the plurality of media content programs that have been intentionally grouped together by the media content provider for consecutive presentation during the predetermined time period, a recorded version of the second media content program to the user immediately following the presentation of the third media content program that is not part of the programing block such that there is no interval of time between the presentation of the third media content program and the presentation of the recorded version of the second media content program.

2. The method of claim 1, wherein the determining that the user has failed to direct the media content processing subsystem to perform the additional access event with respect to the additional episode of the second media content program comprises determining that the user has failed to direct the media content processing subsystem to present or record the additional episode of the second media content program during the time period associated with the provider-scheduled presentation of the additional episode of the second media content program.

3. The method of claim 1, wherein the facilitating of access by the user to the second media content program included in the programming block further comprises directing the media content processing subsystem to automatically record the additional episode of the second media content program during a time period associated with a subsequent provider-scheduled presentation of the additional episode of the second media content program.

4. The method of claim 1, embodied as computer-executable instructions on at least one non-transitory computer-readable medium.

5. A method comprising:

detecting, by a media content presentation system, that an episode of a first media content program is scheduled to be recorded at the direction of a user by a media content processing subsystem during a time period associated with a provider-scheduled presentation of the first media content program, the episode of the first media content program included in a plurality of episodes associated with the first media content program;

identifying, by the media content presentation system, a programming block of which the first media content program is a part, the programming block including a plurality of media content programs of a same genre that have been intentionally grouped together by a media content provider for consecutive presentation during a predetermined time period, the programming block further comprising an additional episode of a second media content program that is included in the plurality of media content programs in the programing block, the additional episode of the second media content program included in a plurality of episodes associated with the second media content program, and each episode included in the plurality of episodes associated with the second media content program different from each episode included in the plurality of episodes associated with the first media content program;

determining, by the media content presentation system, that the user has failed to schedule the additional episode of the second media content program for recording by the media content processing subsystem during the time period associated with the provider-scheduled presentation of the second media content program during the programming block, wherein the time period associated with the provider-scheduled presentation of the second media content program during the programming block precedes the time period associated with the provider-scheduled presentation of the first media content program during the programing block;

determining, by the media content presentation system, that the second media content program is available as a video-on-demand asset;

presenting, during a presentation of the first media content program by the media content presentation system, the user with a notification that is overlaid over the first media content program in a pop-up window and that indicates that the second media content program is related to the first media content program and is available for presentation to the user as the video-on-demand asset;

determining, by the media content presentation system, that the presentation of the first media content program is performed immediately prior to a user-scheduled presentation of a third media content program that is not part of the programing block;

directing, by the media content presentation system, the media content processing subsystem to delay presentation of the second media content program until after the presentation of the third media content program that is not part of the programing block; and directing, by the media content presentation system based on the second media content program being available as a video-on-demand asset and based on the second media content program and the first media content program being part of the same programing block that includes the plurality of media content programs that have been intentionally grouped together by the media content provider for consecutive presentation during the predetermined time period, the media content processing subsystem to automatically present a recorded version of the additional episode of the second media content program to the user immediately following the presentation of the third media content program that is not part of the programming block such that there is no interval of time between the presentation of the third media content program and the presentation of the recorded version of the second media content program.

6. The method of claim 5, further comprising:
directing, by the media content presentation system, the media content processing subsystem to record the episode of the first media content program during the time period associated with the provider-scheduled presentation of the first media content program.

7. The method of claim 5, embodied as computer-executable instructions on at least one non-transitory computer-readable medium.

8. A system comprising:
a detection facility that detects an access event performed by a media content processing subsystem with respect to an episode of a first media content program during a time period associated with a provider-scheduled presentation of the first media content program, the access event initiated by a user associated with the media content processing subsystem, the episode of the first media content program included in a plurality of episodes associated with the first media content program, the access event including a presentation of the episode of the first media content program to the user;
a media content access management facility communicatively coupled to the detection facility and that
identifies a programming block of which the first media content program is a part, the programming block including a plurality of media content programs in a same genre that have been intentionally grouped together by a media content provider for consecutive presentation during a predetermined time period, the programming block further comprising an additional episode of a second media content program that is included in the plurality of media content programs in the programing block, the additional episode of the second media content program included in a plurality of episodes associated with the second media content program, and each episode included in the plurality of episodes associated with the second media content program different from each episode included in the plurality of episodes associated with the first media content program,
determines that the user has failed to direct the media content processing subsystem to perform an additional access event with respect to the additional episode of the second media content program during the time period associated with the provider-scheduled presentation of the second media content program during the programming block, wherein the time period associated with the provider-scheduled presentation of the second media content program during the programming block precedes the time period associated with the provider-scheduled presentation of the first media content program during the programing block, and
facilitates, in response to the determination, access by the user to the second media content program included in the programming block by determining that the second media content program is available as a video-on-demand asset,
presenting, during the presentation of the first media content program by the media content processing subsystem, the user with a notification that is overlaid over the first media content program in a pop-up window and that indicates that the second media content program is related to the first media content program and is available for presentation to the user as the video-on-demand asset,
determining that the presentation of the first media content program is performed immediately prior to a user-scheduled presentation of a third media content program that is not part of the programming block,
directing the media content processing subsystem to delay presentation of the second media content program until after the presentation of the third media content program that is not part of the programming block, and
directing the media content processing subsystem to automatically present, based on the second media content program being available as the video-on-demand asset and based on the second media content program and the first media content program being part of the same programming block that includes the plurality of media content programs that have been intentionally grouped together by the media content provider for consecutive presentation during the predetermined time period, a recorded version of the second media content program to the user immediately following the presentation of the third media content program that is not part of the programming block such that there is no interval of time between the presentation of the third media content program and the presentation of the recorded version of the second media content program.

9. The system of claim 8, wherein the media content access management facility determines that the user has failed to direct the media content processing subsystem to perform the additional access event with respect to the additional episode of the second media content program by determining that the user has failed to direct the media content processing subsystem to present or record the additional episode of the second media content program during the time period associated with the provider-scheduled presentation of the additional episode of the second media content program.

10. The system of claim 8, wherein the media content access management facility further facilitates access by the user to the second media content program included in the programming block by directing the media content processing subsystem to automatically record the additional episode of the second media content program during a time period associated with a subsequent provider-scheduled presentation of the additional episode of the second media content program.

* * * * *